Sept. 20, 1938.    F. TURNBULL    2,130,677
WALKING VEHICLE
Filed July 21, 1936    5 Sheets-Sheet 2
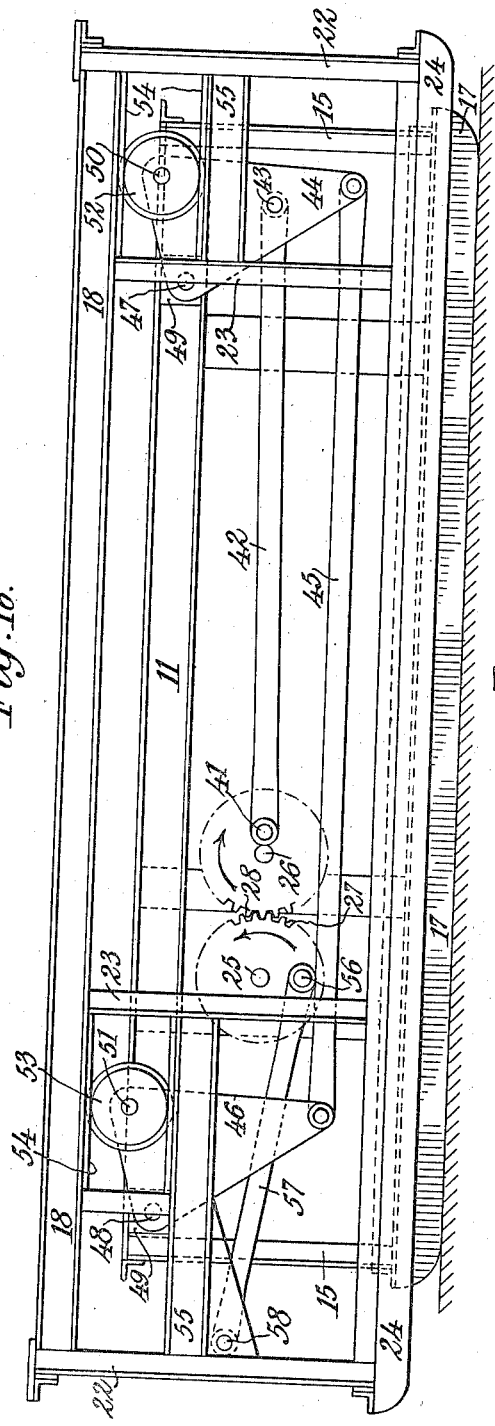
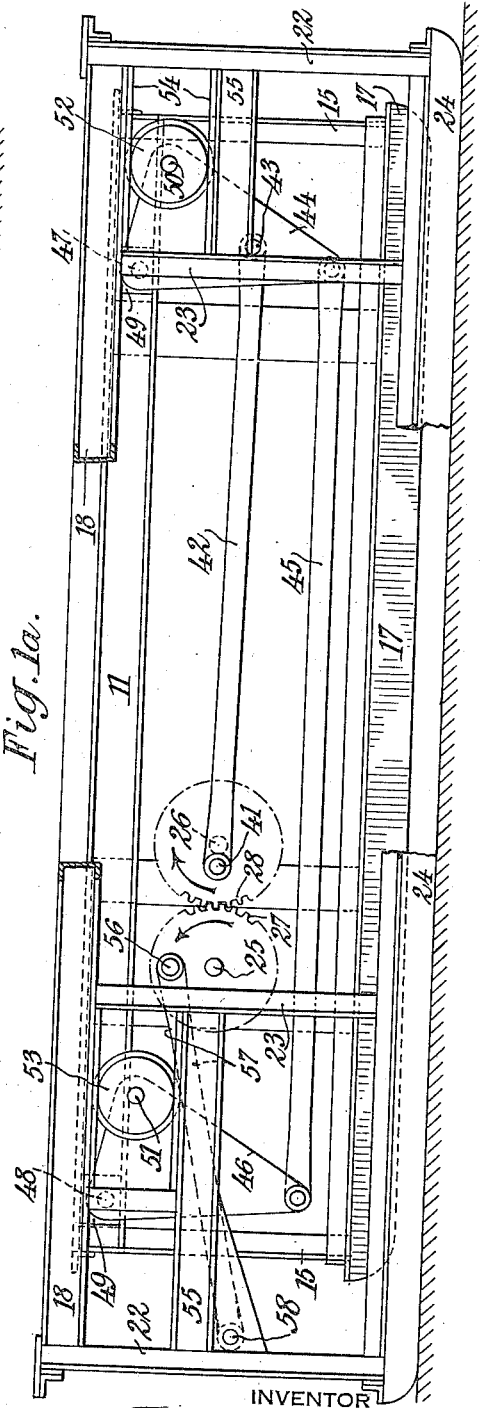
INVENTOR
Frederick Turnbull,
BY
Fraser, Myers & Manley
ATTORNEYS.

Sept. 20, 1938.   F. TURNBULL   2,130,677
WALKING VEHICLE
Filed July 21, 1936   5 Sheets-Sheet 3

Inventor:
Frederick Turnbull,
By his Attorneys,
Fraser, Myers & Manley

Sept. 20, 1938.                F. TURNBULL                    2,130,677
                              WALKING VEHICLE
                            Filed July 21, 1936             5 Sheets-Sheet 5

Inventor:
Frederick Turnbull,
By his Attorneys,
Fraser, Myers & Manley

Patented Sept. 20, 1938

2,130,677

UNITED STATES PATENT OFFICE 2,130,677

WALKING VEHICLE

Frederick Turnbull, Newcastle-upon-Tyne, England

Application July 21, 1936, Serial No. 91,697
In Great Britain July 31, 1935

9 Claims. (Cl. 180—8)

This invention relates to walking vehicles primarily intended for carrying heavy machinery or structures, such as excavators or cranes, over soft ground, and is especially directed to vehicles of the kind comprising an inner member and a plurality of conjoined outer members, said members being provided with treads and being alternately raised, moved lengthwise and lowered by crank mechanism thus propelling the vehicle.

The primary object of the present invention is to provide improved mechanism for operating a vehicle of the kind above referred to.

Another object of the invention is to provide improved means for raising the vehicle off the ground and for swinging it, when so raised, to change its direction of travel as may be desired.

A further object is the provision on one of such members of a portion which may serve as a tread portion and which may be vertically adjusted relatively to said member to vary the height of such tread portion relatively to the ground, this provision being useful in moving the vehicle over uneven ground.

A still further object is the provision of a walking vehicle which may be lineally moved either forwardly or rearwardly and wherein a continuously operable crank mechanism is provided for achieving lengthwise reciprocation of such inner and outer members and, hence, a substantially continuous lineal movement of the vehicle.

With the above and other objects in view which will appear as the description proceeds, the invention consists in the novel features of construction, combinations and arrangements of mechanisms herein described and set out in the appended claims.

The accompanying drawings illustrate a walking vehicle embodying my invention. In the drawings Figure 1 is a side elevation of the vehicle;

Figure 1:
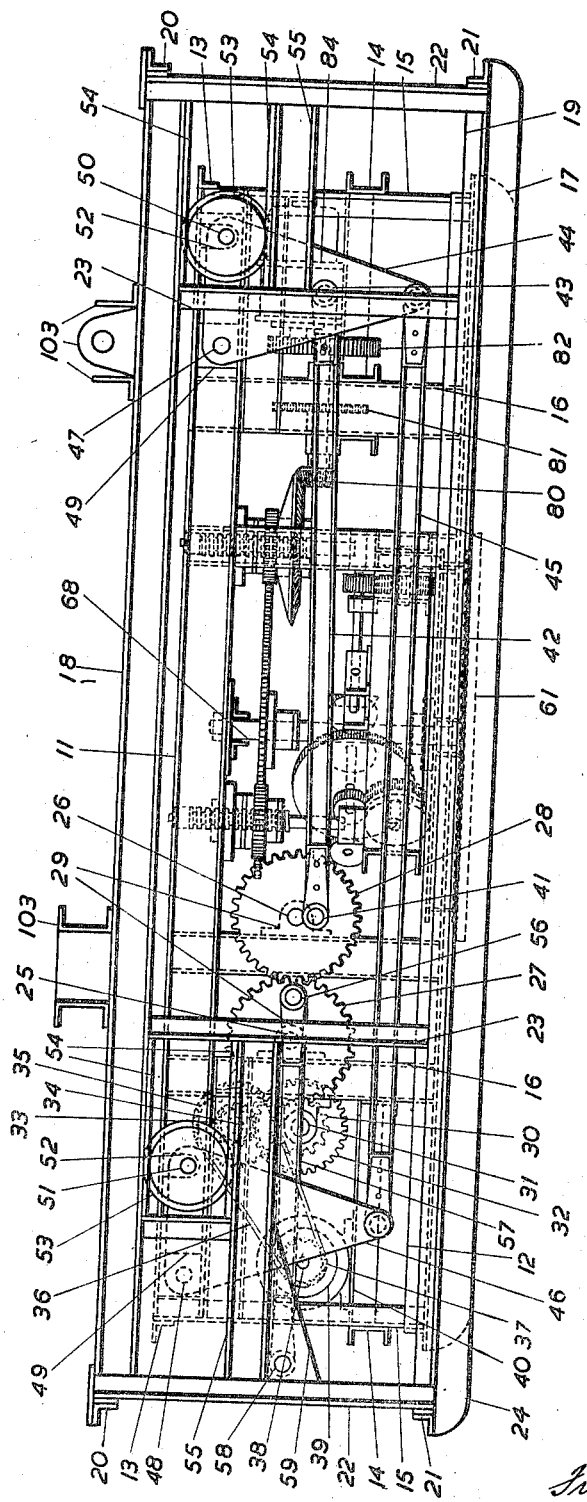
Figures 1a and 1b are also side elevations of the vehicle at different stages in a cycle of operation, but in these figures, for the sake of clarity, only those parts are shown which are necessary to an understanding of the operation of the means provided for alternately raising and lengthwisely moving the inner and outer members to achieve lineal movement of the vehicle.
Figure 2:
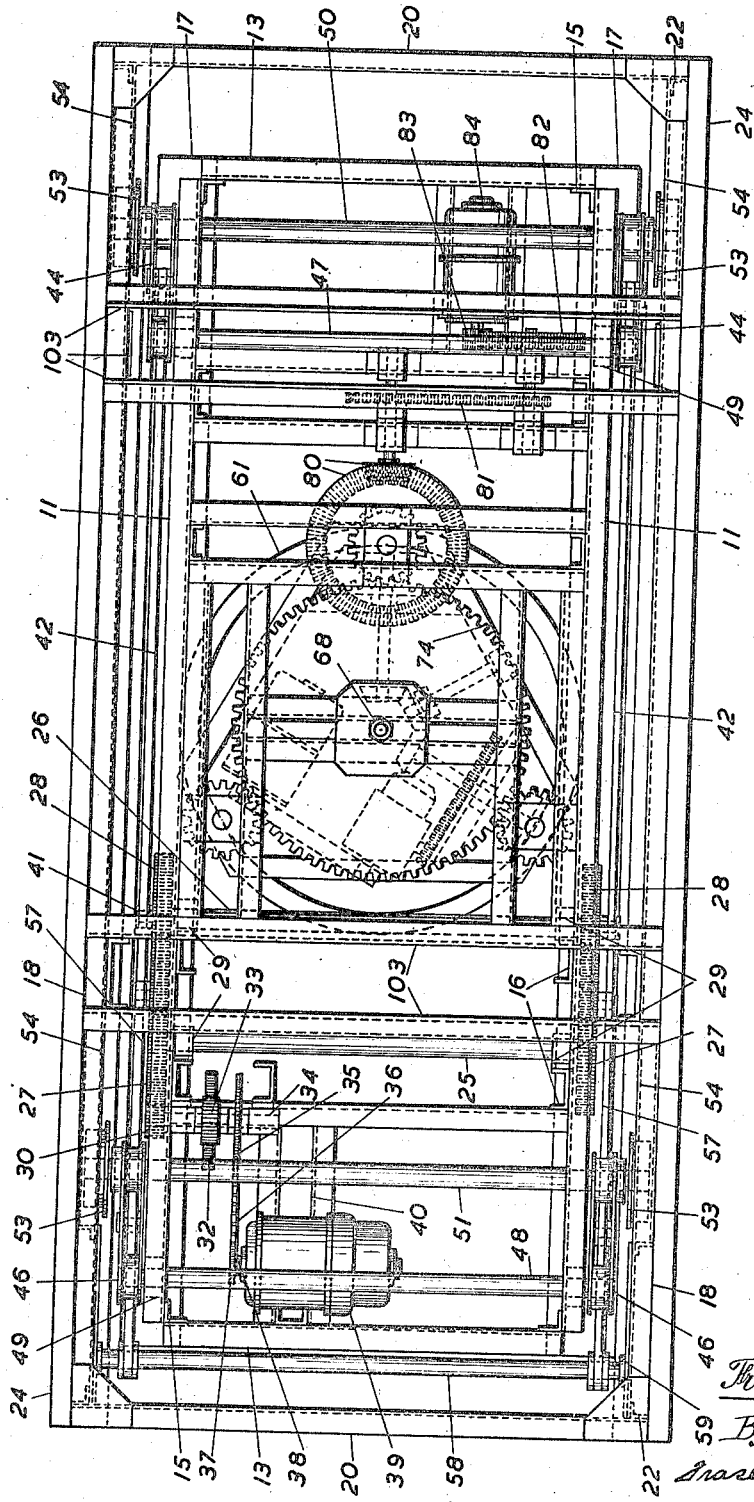
Figure 2 is a plan thereof.
Figure 3:
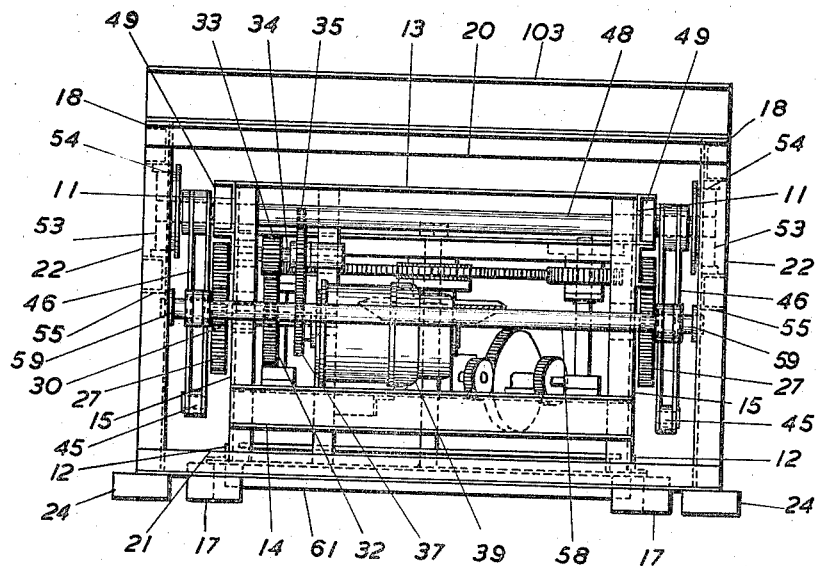
Figure 3 is a view looking on the left-hand end thereof.

Referring more particularly to the specific form of the invention disclosed in the accompanying drawings, the improved vehicle consists of an inner rectangular framework on which the operating and swinging mechanisms are mounted surrounded by an outer rectangular framework which supports the machinery to be transported. The inner framework is built up of longitudinal channel bars 11 and angle bars 12 rigidly attached to transverse angle bars 13 and channel bars 14 by vertical angle bars 15, vertical channel bars 16 being attached at intervals between the side bars 11, 12. The inner framework is fitted with a pair of treads 17 attached to the side angle bars 12. The outer framework is built up of longitudinal channel bars 18 and angle bars 19 rigidly attached to transverse angle bars 20, 21 by vertical angle bars 22, vertical angle bars 23 being attached at intervals between the side bars 18, 19. The outer framework is fitted with a pair of treads 24 parallel with the treads 17.

Transverse shafts 25, 26 fitted at each end with intermeshing toothed crank discs 27, 28 are mounted in bearings 29 supported by opposite vertical bars 16 of the inner framework. The shafts 25, 26 are simultaneously revolved by a pinion 30 gearing with one of the toothed discs 27, said pinion being fixed on a short transverse shaft 31 on which is also fixed a toothed wheel 32 gearing with a pinion 33 on a second short transverse shaft 34. A sprocket wheel 35 on the shaft 34 is coupled by a chain 36 to a sprocket wheel 37 on the shaft 38 of a motor 39 carried by a plate 40 supported by the inner framework. The crank pins 41 of the crank discs 28 at the ends of the shaft 26 are coupled by connecting rods 42 to intermediate points 43 on a pair of bell-crank levers 44 mounted one on each side of the inner framework near one end thereof, the lower ends of said levers being coupled by connecting rods 45 to the lower ends of a similar pair of bellcrank levers 46 near the other end of said framework. The bell-crank levers 44, 46 are pivoted on the ends of transverse shafts 47, 48 supported in fixed bearings 49 depending from the upper side bars 11 of the inner framework. The bell-crank levers are also coupled together by transverse shafts 50, 51 extending through slots 52 in the upper side bars 11 of the inner framework, said shafts being fitted at their ends with rollers 53 engaging between parallel rectilinear bearing surfaces 54 carried by the upper side bars 18 of the outer framework and short side bars 55 connected to said framework.

The crank pins 56 of the crank discs 27 are coupled by connecting rods 57 to a transverse shaft 58 mounted in fixed bearings 59 on the vertical angle bars 22 of the outer framework beyond the adjacent end of the inner framework. The crank discs 27, 28, bell cranks 44, 46 and connecting rods 42, 45 and 57 lie between the sides of the inner and outer frameworks.

It will be best understood, from Figs. 1a and 1b, that as the bell-crank levers 44 and 46 are pivotally connected to the inner framework at the shafts 47, 48, and are also pivotally mounted between the upper and lower parallel rectilinear bearing surfaces 54 on the outer framework, relative vertical movement of said frameworks may be accomplished by rocking the said bell-crank levers, and that as the latter are connected by connecting rod 45, they may rock in unison, thereby maintaining a horizontal parallelism between the two frameworks at all times.

The rocking motion is imparted to the bell-crank levers 44 and 46 by the discs 28, on each side of the vehicle, through the connecting rods 42, which, being connected to crank pins 41, are given a reciprocating movement by the rotation of the said discs.

With the several parts of the device resting upon the ground in the positions shown in Fig. 1, and assuming rotation of the disc 28 in clockwise direction, it will be seen that as the crank pin 41 passes its lowermost position to commence a cycle, the lower ends of the bell-crank levers 44, 46 commence to swing toward the left, raising the inner framework relatively to the outer framework, which latter remains on the ground and, for the time, supports the entire structure. As the pin 41 completes its movement toward the left, as shown in Fig. 1a, the inner framework reaches its uppermost position relatively to the outer framework and when the crank pin 41 reaches its uppermost position, finishing one half of a complete cycle, both the inner and outer frameworks are again resting momentarily substantially upon the ground, the inner frame, however, having moved longitudinally to the right relatively to the outer frame while it was raised from the ground, as is hereinafter more fully explained. As the crank pin 41 passes its uppermost position, the lower ends of the bell-crank levers 44, 46 swing toward the right, as shown in Fig. 1b, raising the outer framework relatively to the inner framework, which latter now remains on the ground and, for the time, supports the entire structure as the outer framework moves upwardly and then back to the position shown in Fig. 1, which position is reached as the cycle is completed by the downward movement of the crank pin 41 to its lowermost position.

As the bell-crank levers 44, 46 swing toward the left from the mid-position shown in Fig. 1, the transverse shafts 50, 51 form temporary fulcrums about which the inner framework rises while the outer framework supports the entire structure, as best seen in Fig. 1a, and as said levers swing toward the right, the shafts 47, 48 form temporary fulcrums about which the outer framework rises while the inner framework supports the entire structure, as best seen in Fig. 1b. Thus, the two frameworks alternately support the weight of the device, much the same as a person's body is alternately supported when walking.

While the two frameworks are alternately raised from the ground, each, when in such raised position, is caused to move forwardly relatively to the other in order to impart lineal movement to the entire device. The connecting rod 57 being pivotally connected at one end to a fixed point on the outer framework at 58 and at the other end to the crank pin 56 on the disc 27, it is apparent that, as the said disc revolves, the connecting rod 57 and the outer framework are reciprocated horizontally relatively to the inner framework. As the discs 27 and 28 are similar in size and rotate together, their respective functions, namely, horizontal relative reciprocation and vertical relative reciprocation, are performed together and in an invariable timed relationship.

The crank pins 41 and 56 are so arranged on the discs 28 and 27 that when the crank pin 41 is at the top or bottom of its movement, in either of which positions the weight of the entire structure is about to be shifted from one framework to the other, the connecting rod 57 is at one end or the other of its stroke, as best understood from Fig. 1. Thus, as each framework shifts to an elevated position and while it continues to be supported in an elevated position, the connecting rod 57 is moving in the mean stages of its stroke, as seen in Figs. 1a and 1b, and such elevated frame is moved forwardly while in a relative sense, the supporting framework is moved rearwardly, but as the latter framework is upon the ground, such relative rearward movement yields no rearward lineal movement of the device as a whole. This alternate forward movement, it will be seen, is similar to the alternate forward movement of a person's feet when walking.

Figure 5:
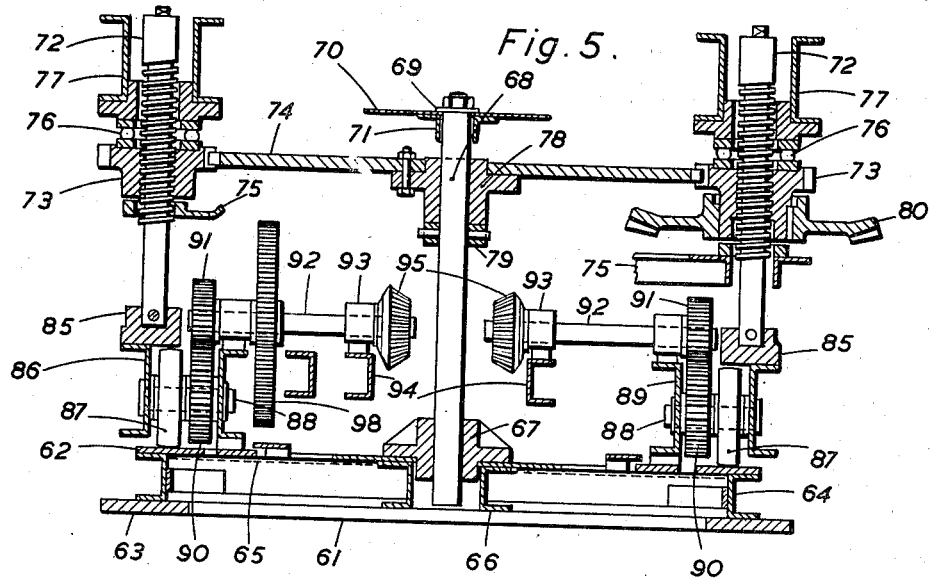
Figure 5 is a section on the line 5—5 in Fig. 4.
Figure 4:
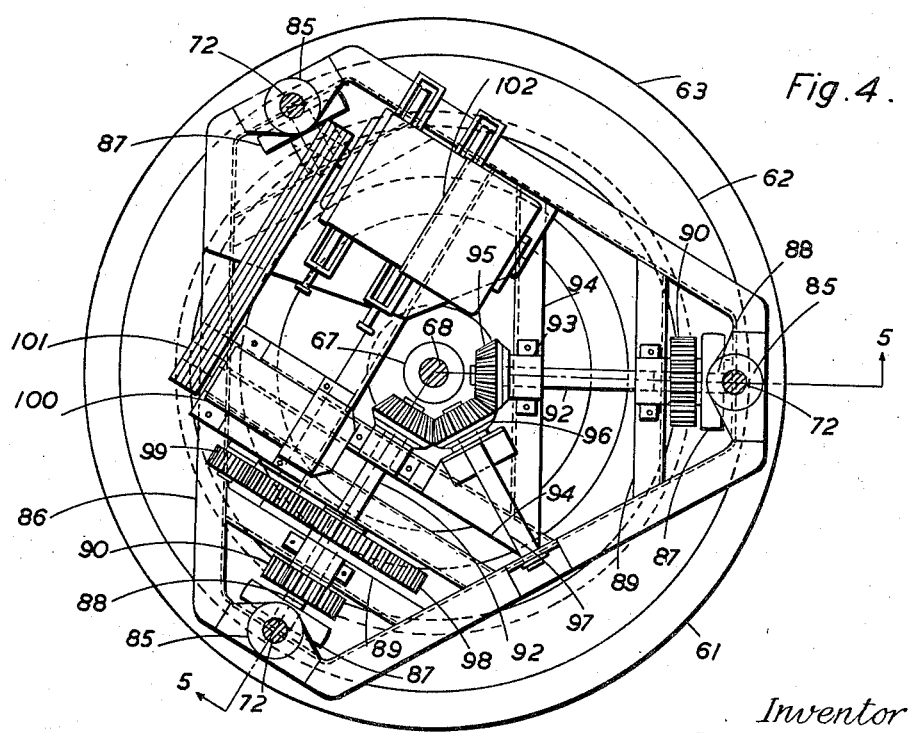
Figure 4 is a part similar view to Fig. 2 showing the concealed portion of the central mechanism of the vehicle.

A turntable 61 is provided centrally in the bottom of the inner framework of the vehicle and comprises a track 62 and an annular plate 63 connected together by a circular channel 64 carried by spokes 65 (shown only in Fig. 5) from a hub 66 carrying a bearing 67. In the bearing is mounted a central shaft 68, the upper end of which is supported by a collar 69 bearing on a plate 70 carried by angle bars 71 carried by the inner framework. The weight of the vehicle is taken by three symmetrically-arranged threaded vertical shafts 72 provided with internally-threaded toothed wheels 73 which are coupled together by a central toothed wheel 74 so that they revolve simultaneously. The wheels 73 are supported by U-shaped brackets 75 carried by the inner framework, and said wheels carry ball-bearings 76 which in turn support transverse and longitudinal inner frame members 77. The hub 78 of the central toothed wheel is supported by a collar 79 pinned to the central shaft 68 about which said wheel is free to revolve. One of the internally-threaded wheels 73 is driven through bevel gearing 80 and chain and sprocket gear 81 by a toothed wheel 82 driven by a pinion 83 on the shaft of a motor 84 on the inner framework. Downward travel of the wheel 73 on the threaded shafts 72 is prevented by the U-shaped brackets 75 which are rigidly attached to the inner framework of the vehicle.

The lower ends of the three shafts 72 are pinned to brackets 85 to which a triangular frame 86 is rigidly attached. Rollers 87 bearing on the track 62 are fixed on axles 88 mounted between the frame 86 and cross members 89 attached to said frame. On two of the three axles 88 pinions 90 are also fixed, said pinions meshing with pinions 91 on radial shafts 92 in bearings 93 carried by the cross members 89 and additional cross members 94. The shafts 92 have bevel wheels 95 coupled together by an interposed bevel wheel 96 on an idle shaft 97. One of the shafts 92 has also fixed on it a pinion 98 meshing with a pinion 99 on the shaft of reduction gearing housed in a casing 100, said gearing being driven by a chain 101 from an electric motor 102 mounted on the frame 86.

It will now be seen that, rotation of the bevel gear 80 simultaneously revolves the internally-threaded wheels 73 on their stationary shafts 72 thus lowering the frame 86 and turntable 61 until the plate 63 bears on the ground, whereupon continued rotation of the wheels 73 raises the vehicle which is then supported only by the turntable. The vehicle, having been raised off the ground, the motor 102 is set in motion to drive the rollers 87 around the track 62 until the vehicle is swung into the desired direction. After swinging the vehicle, the wheels 73 are revolved in the reverse direction to return the vehicle to the ground and to raise the turntable 61 clear thereof.

The motors 33, 84, 102 above referred to are separately controlled by suitable switch gear.

This facility for vertical movement of the turntable 61 relatively to the inner framework on which it is mounted may yield an additional advantage when the vehicle is being moved over uneven ground. The outer framework may be in contact with the ground, affording support to the vehicle, and yet the treads 17 of the inner framework may not descend sufficiently to contact the ground and, in its turn, support the vehicle to permit it to take its next step forward. Under such condition the turntable may be lowered, in the manner heretofore described, to a point below the treads 17, whereupon the turntable may function as a tread and, being lowered to a sufficient extent, may contact the ground and permit the forward movement of the vehicle to be continued.

A converse situation may arise in which the outer framework may fail to descend sufficiently to contact the ground and support the vehicle for another forward step. Under this condition the turntable may function as a tread portion for the inner framework, the treads 17 being temporarily removed, and the turntable may be raised relatively to the inner framework, thus permitting the outer framework to descend sufficiently to contact the ground and permit another step forward, and hence permit the continued forward movement of the vehicle.

The machinery carried by the vehicle is mounted on the outer framework (for example, in brackets 103), the height of said framework being sufficient to clear the operating and swinging mechanism carried by the inner framework.

As the lower part of the vehicle is free from articulated parts (such as the endless chains frequently used to reduce ground pressure), my improved walking vehicle is well adapted for crossing stretches of water, suitable propelling machinery and floats being added for this purpose and the depth of the inner and outer frameworks being increased if necessary.

It should be understood that the vehicle described herein is illustrative only of my inventive concept, and that various modifications may be employed for achieving similar objectives without, however, departing from the spirit of the invention. Furthermore, as the various reciprocating and associated mechanisms of the vehicle may be reversed to reverse the direction of lineal movement of the vehicle, the terms "forwardly" and "rearwardly" are employed in this specification and in the accompanying claims with reference to either of the directions of lineal movement in which the vehicle may be moved.

What I claim as my invention, and desire to secure by Letters Patent is:—

1. In a walking vehicle of the character described herein, mechanism for moving said vehicle horizontally upon a supporting surface, said mechanism comprising two vehicle-supporting frames arranged to work freely one within the other, said inner and outer frames being adapted to be relatively moved in parallel vertical planes, an oscillative element pivotally connected to each of said frames and adapted to reciprocate said frames vertically relatively to each other whereby to cause them alternately to support the vehicle, a crank mechanism mounted upon one of said frames and connected to the other frame and adapted to reciprocate said frames horizontally relatively to each other, and interengaging means, working in unison, adapted to drive said oscillative element and crank mechanism in a timed relationship whereby each of said frames, as it is in turn supported by the other frame of the vehicle, is horizontally moved in the same direction, thus imparting unidirectional horizontal movement to the vehicle.

2. In a walking vehicle of the character described herein, mechanism for moving said vehicle horizontally upon a supporting surface, said mechanism comprising an outer vehicle-supporting frame and an inner vehicle-supporting frame arranged to work freely within the said former frame, said frames being adapted to be relatively moved in parallel vertical planes, a plurality of pairs of oscillative bell-crank levers pivotally mounted on the said inner frame, a pair of crank mechanisms mounted on said inner frame and connected to said bell-crank levers, for simultaneously rocking said bell-crank levers, means carried by said bell-crank levers in rolling engagement with the said outer vehicle-supporting frame whereby the rocking of said levers reciprocates said inner and outer frames vertically relatively to each other to cause them alternately to support the vehicle, a second pair of crank mechanisms connected to and working in unison with said first mentioned pair of crank mechanisms and mounted upon said inner frame, rigid connecting rods, connected to said second pair of crank mechanisms and the said outer frame whereby said inner and outer frames are reciprocated horizontally relatively to each other, and power-driven means for simultaneously driving said pairs of crank mechanisms in a timed relationship whereby each of said frames, as it is in turn supported by the other frame of the vehicle, is horizontally moved in the same direction, thus imparting unidirectional horizontal movement to the vehicle.

3. In a walking vehicle provided with moving mechanism as claimed in claim 1, the combination with said mechanism of means for changing the direction of travel of the vehicle comprising a central turntable pivotally carried by the inner vehicle-supporting frame and normally raised clear of the ground, means for lowering said turntable relatively to said inner frame whereby to raise both the inner and outer vehicle-supporting frames clear of the ground, and means for swinging said frames about said turntable when said frames are entirely supported thereby.

4. In a walking vehicle provided with moving mechanism as claimed in claim 1, the combination with said mechanism of means for changing the direction of travel of the vehicle comprising a central turntable pivotally carried by the inner vehicle-supporting frame and normally raised clear of the ground, not less than three symmetrically-arranged vertical screws carried by said inner frame, rollers on the lower ends of said screws bearing on said turntable, power-driven mechanism carried by said inner frame for simultaneously revolving said screws to lower said turntable relatively to said inner frame whereby to raise both the inner and outer vehicle-supporting frames clear of the ground, and means for swinging said frames about said turntable when said frames are entirely supported thereby.

5. In a walking vehicle provided with moving mechanism as claimed in claim 1, the combination with said mechanism of means for changing the direction of travel of the vehicle comprising a central turntable pivotally carried by the inner vehicle-supporting frame and normally raised clear of the ground, not less than three symmetrically-arranged vertical screws carried by said inner frame, rollers on the lower ends of said screws bearing on said turntable, power-driven mechanism carried by said inner frame for simultaneously revolving said screws to lower said turntable relatively to said inner frame whereby to raise both the inner and outer vehicle-supporting frames clear of the ground, and power-driven mechanism carried by said turntable for simultaneously revolving said rollers to swing the vehicle-supporting frames around on said turntable when said frames are entirely supported thereby.

6. In a walking vehicle of the character described herein, mechanism for moving said vehicle horizontally upon a supporting surface, said mechanism comprising two vehicle-supporting frames arranged to work freely one within the other, said inner and outer frames being adapted to be relatively moved in parallel vertical planes, an oscillative element pivotally connected to each of said frames and adapted to reciprocate them vertically relatively to each other whereby to cause them alternately to support the vehicle, a pair of coacting cranks carried by one of said frames, a connecting rod, connected between one of said cranks and the said oscillative element whereby to oscillate the latter and reciprocate the frames vertically relatively to each other, a connecting rod, connected between the other of said cranks and the other frame whereby to reciprocate the said frames horizontally relatively to each other, the said coacting cranks being arranged to work in such timed relationship that each of said frames, as it is in turn supported by the other frame, is horizontally moved in the same direction, thus imparting unidirectional horizontal movement to the vehicle.

7. A walking vehicle, according to claim 1, the said inter-engaging means which are adapted to drive the oscillative element and the said crank mechanism, being adapted for substantially continuous operation whereby to uninterruptedly move the vehicle along the ground or other supporting surface.

8. A walking vehicle, according to claim 1, the said inter-engaging means which are adapted to drive the oscillative element and the said crank mechanism, being reversible whereby to permit reversal of the movement of the vehicle along the ground or other supporting surface.

9. In a walking vehicle of the character described herein, mechanism for moving said vehicle horizontally upon a supporting surface, said mechanism comprising two vehicle-supporting frames arranged to work freely one within the other, said inner and outer frames being adapted to be relatively moved in parallel vertical planes, means for vertically reciprocating said frames relatively to each other whereby to cause them alternately to support the vehicle, and a crank mechanism mounted upon one of said frames and connected to the other frame and adapted to move each of said frames forwardly while in raised positions relatively to the other frame whereby to impart unidirectional horizontal movement to the vehicle.

FREDERICK TURNBULL.